Patented May 16, 1944

2,348,842

UNITED STATES PATENT OFFICE 2,348,842

ANTIOXIDANT

Philip T. Paul, Naugatuck, Conn., assignor to United States Rubber Company, New York, N. Y., a corporation of New Jersey No Drawing. Application January 13, 1943, Serial No. 472,273

15 Claims. (Cl. 260—808)

This invention relates to improvements in antioxidants, and more particularly for preserving rubber and similar oxidizable materials.

This application is a continuation-in-part of my application Serial No. 374,478, filed January 15, 1941.

An object of the invention is to provide a new class of anti-oxidants or age resisters for unsaturated organic substances which tend to deteriorate by absorption of oxygen from the air, for example, goods of rubber or allied gums, unsaturated fatty oils such as unsaturated vegetable oils, essential oils, petroleum oils and their derivatives such as gasolines, soaps, aldehydes, synthetic resins, turpentine, paints, and the like. A further and important object of this invention is to provide chemicals which additionally act as flex improvers or flex cracking agents for vulcanized rubber such as tire treads, which undergo repeated strain during use. Further objects will be apparent from the following description.

According to the invention, the organic substance is treated with an anti-oxidant of the general formula

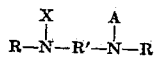

where R represents an aromatic group such as phenyl, naphthyl (or homolog or analog thereof), which may contain further substituents; R' is an arylene nucleus; A is a hydroxy alkyl group; and X is hydrogen or a hydroxy alkyl group.

The materials may be prepared by reacting a diaryl arylene diamine with an alkylene oxide ($C_nH_{2n}O$) or substituted alkylene oxide, enabling the carbon chain, besides being linked to a hydroxy group, to be also linked in the final compounds by a discrete carbon atom to an original secondary amino nitrogen atom; $n$ represents an integer of at least 2. In this reaction the diaryl arylene diamine and the alkylene oxide is reacted by passing the alkylene oxide into a solution of the diaryl arylene diamine in an inert solvent, e. g., dioxane, benzene, etc., or into the molten diaryl arylene diamine. In general, it is necessary to effect this reaction at elevated temperatures of which a range of about 100° C. to about 200° C. is the preferred range. The reaction may be carried out by slowly passing the alkylene oxide into the heated diamine under atmospheric or under super atmospheric pressures. It is desirable that the diamine be stirred so as to continually expose fresh surfaces for hydroxy alkylation and to minimize the formation of N-N'-disubstituted material. The reaction products may be used as prepared, or used in more purified form by separation of certain components, as by removing any unreacted starting materials. Where the composite products show an acid reaction, they may be neutralized with alkali to remove the acid.

It is relatively easy to separate unreacted oxide since this material is very volatile and the unreacted diamine can be substantially separated by extracting the crude product with an organic solvent such as alcohol or benzene in which the diaryl arylene diamine is relatively insoluble. To isolate the monohydroxy alkylated derivative is more difficult as this class of materials is characterized as low melting oils quite soluble in the usual organic solvents. The di-hydroxy alkylated material can be isolated by a series of fractional crystallizations since these materials tend to be more crystallized than the mono-hydroxy alkylated bodies. To prepare the di-hydroxy alkylated derivatives, the preferred procedure is to use a large excess of oxide and to repeat the hydroxy alkylation if necessary.

The composition of the product, produced by the aforesaid reaction, is controlled by the amount of the alkylene oxide that is caused to react with the diaryl arylene diamine. To prepare a product consisting substantially of mono-hydroxy alkylated material between 1 and 2 mols of the oxide, more specifically about 1¼ mols of the oxide, are caused to react with 1 mol of the diamine. To prepare a di-hydroxy alkylated material, at least 2 and preferably 3 or 4 mols of alkylene oxide per mol of diamine are employed in the reaction.

In the reaction between the oxide and the diamine a catalyst usually is not necessary, especially in working with ethylene oxide, propylene oxide, or oxides of four membered rings. However, in the use of the 1,2-oxide of a highly branched carbon chain (iso-butylene oxide) the reactivity is low and a catalyst accelerates the reaction. A number of materials serve as catalysts of which the halogens, their acids and salts are particularly advantageous. Examples of such are bromine, iodine, hydrochloric acid, hydroiodic acid, ferrous chloride, ferrous iodide, aluminum chloride, sulfuric acid, and phosphoric acid.

It may be difficult, as above stated, to isolate the mono-hydroxy alkylated body, since being an unsymmetrical material, it is low melting and usually a viscous liquid, but in general, a product consisting of a preponderant proportion of mono-hydroxy alkylated material may be prepared by passing in an alkylene oxide to the diaryl arylene diamine until the unreacted diamine content drops to a low level such as about 10% or less.

The mono-hydroxy alkylated diaryl arylene diamine may be produced in more purified form by synthesis from a diarylamine. For example, mono-N-(b-hydroxy ethyl) N,N'-diphenyl p-phenylene diamine can be prepared by heating diphenylamine with ethylene oxide to form N-hydroxy alkyl diphenylamine. This product is then nitrosated to form the para-nitroso body (Cloez, Comptes Rendus 124, 898) which can be reduced to the amine by treatment with excess stannous chloride. The acetyl derivative of the amine may be condensed with iodobenzene (Wieland, Ber., 41, 3493) and the resulting acetyl derivative hydrolyzed with alcoholic potassium hydroxide to form the final product. In the event that a diarylamine having both para positions blocked is used as a starting material, the nitrosation will form an ortho-nitroso substituted amine which will ultimately lead to an ortho-phenylene diamine derivative. In the cases of unsymmetrical amines as starting materials, it is advisable to first have a nitro group present in the desired orientation before the reaction with the alkylene oxide. The nitro group is then reduced to an amine which is converted to the secondary amine.

Unlike the reaction products of primary amines with alkylene oxides, such as beta-hydroxy ethyl aniline, which provide poor resistance to heat ageing, and reduced flexing life of the rubber containing them—the present chemicals provide for rubber products having markedly and unexpectedly superior properties in this respect.

Another advantage of the present anti-oxidants is that they are substantially non-blooming in rubber, which is a characteristic absent from diaryl arylene diamines such as N,N'-diphenyl p-phenylene diamine.

In addition to being more soluble in rubber than the diaryl arylene diamines, the present reaction products are soluble in ketone-amine condensation products to produce a mixed anti-oxidant which is superior to that referred to in Howland U. S. Patent No. 2,183,567. For example, in the case of diphenyl p-phenylene diamine and acetone-diphenylamine condensate, approximately 5% of the diamine can be dissolved, while the reaction product of 1¼ mols of ethylene oxide with 1 mol of p-phenylene diamine is soluble to a greater extent with the acetone-diphenylamine condensate. The reaction product of the oxide and a diaryl arylene diamine is also more soluble, than the diphenyl phenylene diamine, in 2,2,4-trimethyl 1,2-dihydroquinoline.

Exemplary of the oxides which may be reacted with any of the diamines as disclosed are the following:

Ethylene oxide
Propylene oxide
n-Butylene oxide
Iso-butylene oxide
n-Amylene oxide
Trimethylene oxide
Tetra methylene oxide
Penta methylene oxide Exemplary of the di-amines which may be reacted with any of the oxides as disclosed are the following:

Diphenyl p-phenylene diamine
Diphenyl m-phenylene diamine
Diphenyl o-phenylene diamine
Ditolyl p-phenylene diamine
Di(p-anisyl p-phenylene) diamine
Di(p-xenyl p-phenylene) diamine
Di-beta-naphthyl p-phenylene diamine
Di-alpha-naphthyl p-phenylene diamine
Diphenyl 1-4 naphthalene diamine
Di(p-chloro phenyl) p-phenylene diamine
Di(p-tert butyl phenyl) p-phenylene diamine
Diphenyl p-tolylene diamine The following examples in which the parts are by weight, are given to illustrate the invention and are not to be considered as limiting thereof:

EXAMPLE 1.—*Preparation of N-(b-hydroxy ethyl) N,N'-diphenyl p-phenylene diamine*

N-(b-hydroxy ethyl) diphenylamine, a yellow oil B. R. 155–160° C. at 1 mm. mercury pressure was prepared by heating 33.8 gr. diphenylamine and 8.8 gr. ethylene oxide 15 hours at 240–250° C. This material was acetylated by refluxing 107 gr. of it with 56 gr. acetic anhydride 1 hour. The acetyl derivative distilled 140–145° C. at 1–2 mm. and was converted to the p-nitroso derivative by treating 79 gr. of it in 250 cc. alcohol and 65 cc. concentrated hydrochloric acid at 5° C. with 17.3 gr. sodium nitrite in 75 cc. water after which the p-nitroso derivative was reduced with 169 gr. stannous chloride dihydrate in 125 cc. concentrated hydrochloric acid. The reduced solution was made alkaline and the amine separated by extraction. It boiled 170–205° C. at 1 mm. The acid reduction partially hydrolyzed the acetyl group which is the reason for the 35° C. boiling range of the reduced product; however, the acetyl group was reintroduced in the next step.

The reduced amine B. R. 170–205° C. at 1 mm. (50 gr.) was allowed to stand 45 minutes with 50 cc. acetic anhydride and 40 cc. acetic acid. A yield of 32.5 gr. crystalline acetyl derivative was obtained. This 32.5 gr. was refluxed 25 hours in 100 cc. methyl hexyl carbinol with 21.2 gr. iodo-benzene, 19.4 gr. anhydrous potassium carbonate and ½ gr. copper powder. After removing the methyl hexyl carbinol by steam distillation and the inorganic chemicals by extraction with benzene and removing the benzene by evaporation with alcohol the residue was hydrolyzed with 10 gr. sodium hydroxide in 10 cc. water and 50 cc. alcohol by refluxing 5 hours. The product distilled

| Fraction | Boiling range |
|---|---|
| I | 186–242° C. at 4 mm. |
| II | 240–260° C. at 4 mm. |
| III | 270–280° C. at 4 mm. |

Fraction II is N-(b-hydroxy ethyl) N,N' diphenyl p-phenylene diamine. In the subsequent rubber tests it is identified as chemical I.

EXAMPLE 2.—*Preparation pure N,N'-di (beta hydroxy ethyl) N,N'-diphenyl p-phenylene diamine*

Diphenyl p-phenylene diamine (26 gr.) (0.1 mol) and 15 cc. (13.2 gr.; 0.3 mol) ethylene oxide were heated in a sealed tube overnight at 155° C. and then overnight at 250° C. The contents of the tube were dissolved in hot benzene. On cooling, the desired product crystallized out. Recrystallized from dilute alcohol. Yield 17 grams. Pure white crystals, melting point 134° C. In the subsequent rubber test examples it is identified as Chemical II.

EXAMPLE 3.—*Preparation of N-(b-hydroxy ethyl) N,N'-diphenyl p-phenylene diamine from ethylene oxide and diphenyl p-phenylene diamine*

In a 5 gallon steel autoclave equipped with a stirrer, 22 pounds, 14 ounces (1 mol) of technical diphenyl p-phenylene diamine was heated to 175° C. Over an 8 hour period, 4 pounds, 10 ounces (1.24 mol) of ethylene oxide was passed in. Heating and stirring were continued 1 hour and the contents discharged. The product is a heavy viscous material consisting substantially of N-(b-hydroxy ethyl) N,N'-diphenyl p-phenylene diamine. It is identified as chemical III in the rubber tests.

EXAMPLE 4

Ethylene oxide (6 cc.) was condensed in a test tube in an acetone-dry ice bath and the tube closed so as to effect a thin seal. N,N'-diphenyl p-phenylene diamine (26 grams) was placed in a Carius tube along with a small piece of steel and the tube of ethylene oxide. After the Carius tube had been sealed it was shaken until the steel broke the test tube containing the ethylene oxide. The contents were then heated overnight at 175° C. and the product was purified by dissolving in acetone, filtering and removing the solvent by vacuum distillation. The product, a thick oil analyzed 8.64 percent nitrogen. It is identified as chemical IV in the rubber tests. It consists of a mixture of N-(b-hydroxy ethyl) N,N'-diphenyl p-phenylene diamine and N,N' di-(b-hydroxy ethyl) N,N'-diphenyl p-phenylene diamine.

EXAMPLE 5

Diphenyl p-phenylene diamine (20 gr.) and 12 gr. isobutylene oxide were autoclaved 72 hours at 200° C. The product on vacuum distillation gave two fractions:

Fraction I, boiling range___ 225–250° C. at 3 mm.
Fraction II, boiling range__ 260–265° C. at 3 mm.

The latter, a dark red oil, consists substantially of N-(b-hydroxy isobutyl) N,N'-diphenyl p-phenylene diamine. It analyzed 8.8% nitrogen. Theory 8.45% nitrogen. According to this analysis the distillate consisted of 15% diphenyl p-phenylene diamine and 85% N-(b-hydroxy isobutyl) N,N'-diphenyl p-phenylene diamine. It is identified as chemical V in the rubber tests.

EXAMPLE 6

Diphenyl p-phenylene diamine (26 gr.) was autoclaved overnight at 200° C. with 5.8 gr. propylene oxide and 0.1 gr. iodine as catalyst. The product was dissolved in benzene and the solution washed with dilute sodium hydroxide. On vacuum distillation a thick red oil—boiling range 250–275° C. at 5 mm. was obtained. It is identified as chemical VI in the rubber tests.

The following examples refer to rubber testing data:

EXAMPLE 7.—*Test of chemical I of Example 1 and test of chemical II of Example 2*

Master batch used:

| | |
|---|---|
| Smoked sheet | 100 |
| Carbon black | 45 |
| Zinc salt of cocoanut oil fatty acids | 3.5 |
| Pine tar | 3.5 |
| Zinc oxide | 5.0 |
| Sulfur | 3.0 |
| | 160.0 |

| | A (control) | B | C |
|---|---|---|---|
| Above M. B. | 160 | 160 | 160 |
| Chemical I | | 1.0 | |
| Chemical II | | | 1.0 |
| Mercapto benzo thiazole (accelerator) | 1.0 | 1.0 | 1.0 |

Cures were made for 30, 45, 60, and 75 minutes at 30 pounds per square inch steam pressure.

UNAGED TENSILES (IN POUNDS PER SQUARE INCH)

| Cure | Elongation | A | B | C |
|---|---|---|---|---|
| 30 minutes at 45 lbs. per sq. in. | 300 | 780 | 1,160 | 780 |
| | 500 | 1,870 | 2,640 | 2,020 |
| | Break | 3,050–685 | 3,710–660 | 3,320–680 |
| 45 minutes at 45 lbs. per sq. in. | 300 | 980 | 1,380 | 1,020 |
| | 500 | 2,380 | 2,980 | 2,470 |
| | Break | 3,570–652 | 3,840–602 | 3,620–657 |
| 60 minutes at 45 lbs. per sq. in. | 300 | 1,220 | 1,410 | 1,150 |
| | 500 | 2,610 | 3,170 | 2,780 |
| | Break | 3,640–646 | 3,670–595 | 3,710–655 |
| 75 minutes at 45 lbs. per sq. in. | 300 | 1,270 | 1,580 | 1,290 |
| | 500 | 2,780 | 3,250 | 3,030 |
| | Break | 3,630–625 | 3,690–558 | 3,620–603 |

AGED 96 HOURS UNDER 300 POUNDS OXYGEN AT 70° C.

| Cure | Elongation | A | B | C |
|---|---|---|---|---|
| 30 minutes at 45 lbs. per sq. in. | 300 | 470 | 1,190 | 810 |
| | 500 | | 2,210 | 1,870 |
| | Break | 730–440 | 2,590–600 | 2,490–613 |
| 45 minutes at 45 lbs. per sq. in. | 300 | 460 | 1,350 | 1,010 |
| | 500 | | | 2,050 |
| | Break | 530–310 | 2,220–476 | 2,350–533 |
| 60 minutes at 45 lbs. per sq. in. | 300 | | 1,390 | 1,200 |
| | 500 | | | 2,210 |
| | Break | 430–296 | 2,000–416 | 2,320–506 |
| 75 minutes at 45 lbs. per sq. in. | 300 | | 1,390 | 1,260 |
| | 500 | | | |
| | Break | 450–283 | 1,940–403 | 2,120–466 |

UNAGED DUMB-BELL FLEXINGS

| Cure | A | B | C |
|---|---|---|---|
| 30 minutes at 45 lbs. per sq. in. | 450 | 480 | 537 |
| 45 minutes at 45 lbs. per sq. in. | 403 | 510 | 513 |
| 60 minutes at 45 lbs. per sq. in. | 243 | 377 | 350 |
| 75 minutes at 45 lbs. per sq. in. | 210 | 343 | 343 |
| | 1,306 | 1,710 | 1,733 |

EXAMPLE 8.—*Test of chemical III of Example 3*

To a copolymer of butadiene and styrene (Buna S type rubber) chemical III in the ratio, by weight, of 1 part was added to 100 parts copolymer. This addition was done on the mill. The thus protected polymer was aged 6 days at 212° F. while the unprotected polymer was aged 4 days at 212° F. The reason for this spread in ageing is that, if the unprotected polymer were aged 6 days, it would be completely deteriorated.

The stocks were then compounded as follows, the parts being by weight:

| | Control | Anti-oxidant stock |
|---|---|---|
| Copolymer | 100 | 100 |
| Anti-oxidant | | 1.0 |
| Sulfur | 2.0 | 2.0 |
| Coal tar softener | 5.0 | 5.0 |
| Carbon black | 50.0 | 50.0 |
| Stearic acid | 2.0 | 2.0 |
| Zinc oxide | 5.0 | 5.0 |
| Mercaptobenzothiazole | 1.5 | 1.5 |

The stocks were cured 30, 45, and 60 minutes at 45 pounds per square inch steam pressure.

TENSILES (AFTER AGEING)

| Cure | Elongation | Control | Anti-oxidant |
|---|---|---|---|
| 30 minutes at 45 lbs. per sq. in. | 300 | 390 | 410 |
| | 500 | 1,000 | 1,180 |
| | Break | 1,480–640 | 2,240–773 |
| 45 minutes at 45 lbs. per sq. in. | 300 | 590 | 650 |
| | 500 | 1,590 | 1,640 |
| | Break | 1,990–560 | 2,800–673 |
| 60 minutes at 45 lbs. per sq. in. | 300 | 800 | 1,000 |
| | 500 | | 2,050 |
| | Break | 1,850–486 | 2,410–565 |

EXAMPLE 9.—*Test of chemical IV of Example 4*

This material was tested in a typical tread stock of natural rubber, the parts being by weight:

| | |
|---|---|
| Smoked sheet | 100 |
| Carbon black | 45 |
| Zinc soap of cocoanut oil acids | 3.5 |
| Pine tar | 3.5 |
| Zinc oxide | 5.0 |
| Sulfur | 3.0 |
| Mercaptobenzothiazole (accelerator) | 1.0 |

Cures were made for 45, 60, 70, and 90 minutes at 30 pounds per square inch steam pressure. Chemical IV was incorporated in the proportion of 1 part per 100 parts of rubber.

The anti-oxidant was superior to the control stock in resisting ageing 96 hours under 300 pounds per square inch oxygen at 70° F. Unaged De Mattia flexings are as follows:

| | Control | Chemical IV |
|---|---|---|
| Kilocycles to end point | 1,949 | 3,109 |

EXAMPLE 10.—*Test of chemical V of Example 5 and test of chemical VI of Example 6*

These materials were tested in the same tread stock as in the previous example using 1 part per 100 parts rubber. They too imparted improved resistance to ageing in oxygen 96 hours under under 300 pounds per square inch pressure at 70° F. and 96 hours at 212° F.

UNAGED DUMB-BELL FLEXINGS

| | Control | Chemical V | Chemical VI |
|---|---|---|---|
| Kilocycles to end point | 1,906 | 4,419 | 4,510 |

The anti-oxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the anti-oxidant may be dissolved therein in a suitable small proportion. The anti-oxidant may be incorporated into solid substances by milling or mastication and prepared for incorporation into dispersions or solutions either in powder, paste or solution form, or applied in such forms for incorporation by diffusion, to the surfaces of vulcanized or unvulcanized rubber goods.

The term "a rubber" is employed in the claims to define a vulcanizable plastic material which possesses high extensibility under load coupled with the property of flexibly retracting to approximately its original size and shape after the load is removed and includes india rubber, balata, gutta percha, and other natural rubbers as well as synthetic vulcanizable products such as polychloroprene, olefin polysulfides, butadiene polymers, and modified butadiene polymers (Buna N and Buna S) and the like, which have a flexibility and elasticity similar to rubber, and reclaims and latices of such materials, which deteriorate upon ageing, whether or not admixed with fillers, pigments, accelerating agents, softeners, etc.

Having thus described my invention, what I claim and desire to protect by Letters Patent is:

1. A method of preserving organic substances which tend to deteriorate by absorption of oxygen from the air which comprises incorporating therein a compound of the general formula

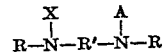

where R represents an aromatic nucleus; R' is an arylene nucleus; A is a hydroxy-alkyl group having at least two carbon atoms in the chain; and X is a radical selected from the class consisting of hydrogen, and a hydroxy-alkyl group.

2. A method of preserving organic substances which tend to deteriorate by absorption of oxygen from the air which comprises incorporating therein a compound of the general formula

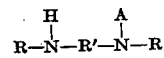

where R represents an aromatic nucleus; R' is an arylene nucleus; and A is a hydroxy-alkyl group having at least two carbon atoms in the chain.

3. A method of preserving organic substances which tend to deteriorate by absorption of oxygen from the air which comprises incorporating therein a compound having the general formula

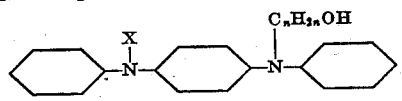

where X is a radical selected from the class consisting of hydrogen and $C_nH_{2n}OH$; and $n$ is an integer of at least 2.

4. A method of preserving organic substances which tend to deteriorate by absorption of oxygen from the air which comprises incorporating therein a compound having the general formula

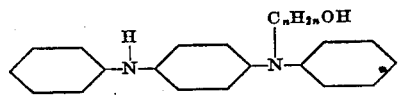

where $n$ is an integer of at least 2.

5. A method of preserving organic substances which tend to deteriorate by absorption of oxygen from the air which comprises incorporating therein a compound having the general formula

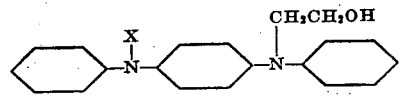

where X is a radical selected from the class consisting of hydrogen and $CH_2CH_2OH$.

6. A method of preserving organic substances which tend to deteriorate by absorption of oxygen from the air which comprises incorporating therein a compound having the general formula

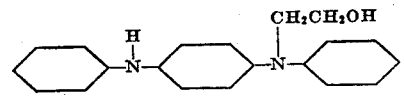

7. A method of preserving organic substances which tend to deteriorate by absorption of oxygen from the air which comprises incorporating therein an N,N'-diaryl p-arylene diamine in which an original secondary amino nitrogen atom is directly attached to a carbon atom of a saturated hydrocarbon chain, another of the carbon atoms of said chain being directly attached to a hydroxy radical.

8. A method of preserving a rubber composition which comprises incorporating therein an N,N'-diaryl p-arylene diamine in which an original secondary amino nitrogen atom is directly attached to a carbon atom of a saturated hydrocarbon chain, another of the carbon atoms of said chain being directly attached to a hydroxy radical.

9. A method of preserving organic substances which tend to deteriorate by absorption of oxygen from the air which comprises incorporating therein an N,N'-diaryl p-arylene diamine in which an original secondary amino nitrogen atom is directly attached to a carbon atom of an alkanol group containing at least two carbon atoms in the chain.

10. A method of preserving a rubber composition which comprises incorporating therein an N,N'-diaryl p-arylene diamine in which an original secondary amino nitrogen atom is directly attached to a carbon atom of an alkanol group containing at least two carbon atoms in the chain.

11. An organic substance which tends to deteriorate by absorption of oxygen from the air containing a compound as set forth in claim 1.

12. An organic substance which tends to deteriorate by absorption of oxygen from the air containing a compound as set forth in claim 3.

13. A rubber composition containing a compound as set forth in claim 3.

14. An organic substance which tends to deteriorate by absorption of oxygen from the air containing an N,N'-diaryl p-arylene diamine in which an original secondary amino nitrogen atom is directly attached to a carbon atom of a saturated hydrocarbon chain, another of the carbon atoms of said chain being directly attached to a hydroxy radical.

15. A rubber composition containing an N,N'-diaryl p-arylene diamine in which an original secondary amino nitrogen atom is directly attached to a carbon atom of an alkanol group containing at least two carbon atoms in the chain.

PHILIP T. PAUL.